United States Patent
Kemmet et al.

(12)

(10) Patent No.: US 12,358,487 B2
(45) Date of Patent: Jul. 15, 2025

(54) DRIVEAWAY PREVENTION FOR ELECTRIC TRAILER CHARGING PLUG

(71) Applicant: eNow Systems LLC, Warwick, RI (US)

(72) Inventors: Ryan Kennedy Kemmet, Phoenix, AZ (US); Jeffrey C. Flath, Warwick, RI (US); Robert W. Doane, Harwich, MA (US)

(73) Assignee: eNow Systems LLC, Warwick, RI (US)

( * ) Notice: Subject to any disclaimer, the term of this patent is extended or adjusted under 35 U.S.C. 154(b) by 467 days.

(21) Appl. No.: 17/830,636

(22) Filed: Jun. 2, 2022

(65) Prior Publication Data

US 2022/0402473 A1 Dec. 22, 2022

Related U.S. Application Data

(60) Provisional application No. 63/196,367, filed on Jun. 3, 2021.

(51) Int. Cl.
| | |
|---|---|
| *B60W 10/08* | (2006.01) |
| *B60L 58/12* | (2019.01) |
| *B60R 16/023* | (2006.01) |
| *B60W 10/26* | (2006.01) |
| *B60R 25/04* | (2013.01) |

(52) U.S. Cl.
CPC .............. *B60W 10/08* (2013.01); *B60L 58/12* (2019.02); *B60R 16/0232* (2013.01); *B60W 10/26* (2013.01); *B60R 25/04* (2013.01); *B60W 2300/125* (2013.01); *B60W 2300/145* (2013.01)

(58) Field of Classification Search
CPC ................ B60W 10/08; B60W 10/26; B60W 2300/125; B60W 2300/145; B60L 58/12; B60R 16/0232; B60R 25/04
See application file for complete search history.

(56) References Cited

U.S. PATENT DOCUMENTS

| | | | |
|---|---|---|---|
| 2015/0066257 A1* | 3/2015 | Ochocinski | B60K 28/10 180/65.21 |
| 2022/0014037 A1* | 1/2022 | Patel | B60L 50/66 |

FOREIGN PATENT DOCUMENTS

WO    WO-2017004683 A1 *  1/2017  ............. B67D 7/065

* cited by examiner

*Primary Examiner* — Jelani A Smith
*Assistant Examiner* — Paul A Castro
(74) *Attorney, Agent, or Firm* — Pauley Erickson & Swanson

(57) ABSTRACT

A motion detection and interlock mechanism prevents unintended drive-off of a trailer still connected to a charging source, which could cause damage and/or injury if continued unimpeded. Trailer power for electrical components is a high voltage AC connection, typically between 277-480 VAC. Forced disconnection of an engaged plug could damage the plug and receptacle, leave electrical conductive members unprotected, and cause a short circuit. Electrical connections to trailers may be made for powering electric TRUs (Transport Refrigeration Units) for refrigerated loads, and for charging a storage battery for powering the TRU over the road or even the tractor itself in the case of a hybrid/electric tractor. In configurations herein, an e-axle is provided on the trailer suspension, such that a driveaway prevention circuit reverse biases the wheels to prevent movement of the trailer while engaged with a charging outlet.

19 Claims, 4 Drawing Sheets

DRIVEAWAY PREVENTION FOR ELECTRIC TRAILER CHARGING PLUG

RELATED APPLICATIONS

This patent application claims the benefit under 35 U.S.C. § 119(e) of U.S. Provisional Patent Application No. 63/196,367, filed Jun. 3, 2021, entitled "DRIVEAWAY PREVENTION FOR ELECTRIC TRAILER CHARGING PLUG," incorporated herein by reference in entirety.

BACKGROUND

Modern battery technology has provided electric vehicles that rival the performance of gasoline and diesel counterparts, and tractor trailer (Class 8 trucks) are no exception. Tractor trailer trucks are commonly visible on interstate highways for transport of various goods and commodities. While conventional trailers are often passive, drawing needed electric power for lights from the corresponding tractor, electric refrigeration units may be employed on the trailers for transport of perishable and frozen goods. Other powered components may include liftgates or other suitable accessories. Mobile electric loads need to be sourced from a rechargeable battery that is typically connected to an external power source when idle or parked. A physical cable and plug arrangement engages with a suitable socket on a charger enabled trailer bay or parking arrangement for charging the battery during vehicle downtime.

SUMMARY

A motion detection and interlock mechanism prevents unintended drive-off of a trailer still connected to a charging source, which could cause damage and/or injury if continued unimpeded. Trailer power for electrical components is a high voltage AC connection, typically between 277-480 VAC. Forced disconnection of an engaged plug could damage the plug and receptacle, leave electrical conductive members unprotected, and cause a short circuit. Electrical connections to trailers may be made for powering electric TRUs (Transport Refrigeration Units) for refrigerated loads, and for charging a storage battery for powering the TRU over the road or even the tractor itself in the case of a hybrid/electric tractor. In configurations herein, an e-axle is provided on the trailer suspension, such that a driveaway prevention circuit reverse biases the wheels to prevent movement of the trailer while engaged with a charging outlet. A similar detection can apply for theft and unauthorized movement prevention.

Configurations herein are based, in part, on the observation that trailer vehicles often maintain physical wired connections to electrical grid AC when parked, and many trailer bays provide so-called "shore power" for such connections. Unfortunately, conventional approaches to trailer bay power connections provide no active warnings or interconnections to alert drivers to a connected power/charge cable prior to departing with an attached trailer. Consumer EVs (cars) do not have this problem because the charging and drive circuits are part of the same immutable units; in contrast, trailers are unavoidable separate from their tractor counterparts. Accordingly, configurations herein substantially overcome the problems of accidental drive-away by employing an e-axle in a reverse biased mode for preventing unintended driveaway by engaging the e-axle to maintain the wheels in a stationary position to alert the tractor driver.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations presented below show examples of a trailer vehicle including electrical storage devices and related components. In the description that below, the following definitions are employed:

Transport Refrigeration Unit (TRU): a refrigeration apparatus for maintaining a cooling temperature in the enclosed trailer volume, generally for consumable food items such as fresh (refrigerated) cargo and frozen stock. TRUs as disclosed herein operate on electrical power using an arrangement of motor driven compressors and heat exchangers.

Electrical Storage Device: a battery for storing and releasing electrical energy for powering vehicle loads such as a TRU and motive power to the tractor in hybrid arrangements. The electrical storage device differs from the starting battery used in an internal combustion engine by having a greater size and energy storage capacity. Various battery chemistries are available, however lithium ion batteries are often employed due to a high capacity for storage and current delivery.

Trailer—a passive articulated portion of a transport truck adapted for cargo storage and external motive transport by a tractor vehicle for propulsion.

Tractor—a propulsion vehicle having a hitch or "$5^{th}$ wheel" for articulated attachment to one or more trailer vehicles. The tractors may be powered by an internal combustion (IC) engine, electric motors, or a hybrid combination. Often referred to as class-8 trucks, various arrangements of articulated vehicles with different wheel/axle combinations are operable with configurations herein.

Vehicle Load—A vehicle load generally refers to an electrical consumption by the tractor/trailer articulated combination, including high drain loads such as the TRU and motive propulsion power from electrical drive sources. Starting of an IC engine by a starter motor is usually reserved for the 12V/24V vehicle native starting and charging system.

Source—a source of electrical energy, for either storage in the electrical storage device or powering a load; note that the electrical storage device can itself act as a source for powering a load. Solar panels, external AC connections (shore power), e-axles and also excess current from the native vehicle alternator may all be invoked as sources.

Figure 1:
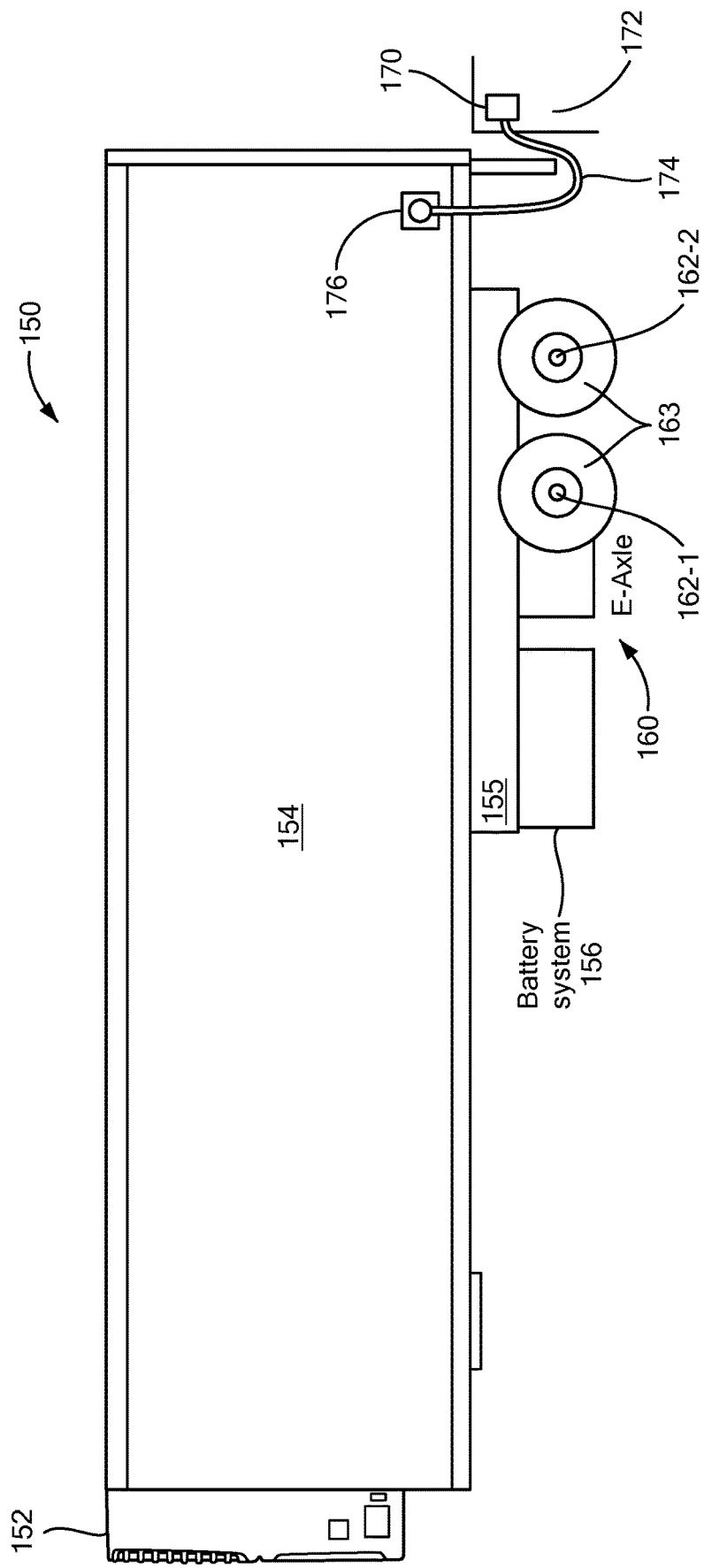
FIG. 1 is a context view of a trailer bay environment suitable for use with configurations herein.

FIG. 1 is a context view of a trailer bay environment suitable for use with configurations herein. Referring to FIG. 1, class 8 trucks, more commonly known as "tractor-trailers"

or "18-wheelers," employ a trailer vehicle 150 for storage of transported goods with an articulated attachment to a tractor vehicle providing propulsion. Trailers may also employ a Transport Refrigeration Unit (TRU) 152 for refrigeration of the cargo area 154 for perishable shipments. While conventional propulsion and refrigeration relies on internal combustion engines, modern approaches employ hybrid and electric powering of these transport vehicles. Such trailers are equipped with a storage battery 156 or suitable electric storage device and multiple sources of electrical power and generation, including solar panel controls and electrical sources such as those disclosed in US Pat. No. 10,710,725, filed Jan. 30, 2018, entitled "MULTIPLE VEHICULAR CHARGE SOURCES AND LOADS," incorporated herein by reference in entirety.

Figure 2:
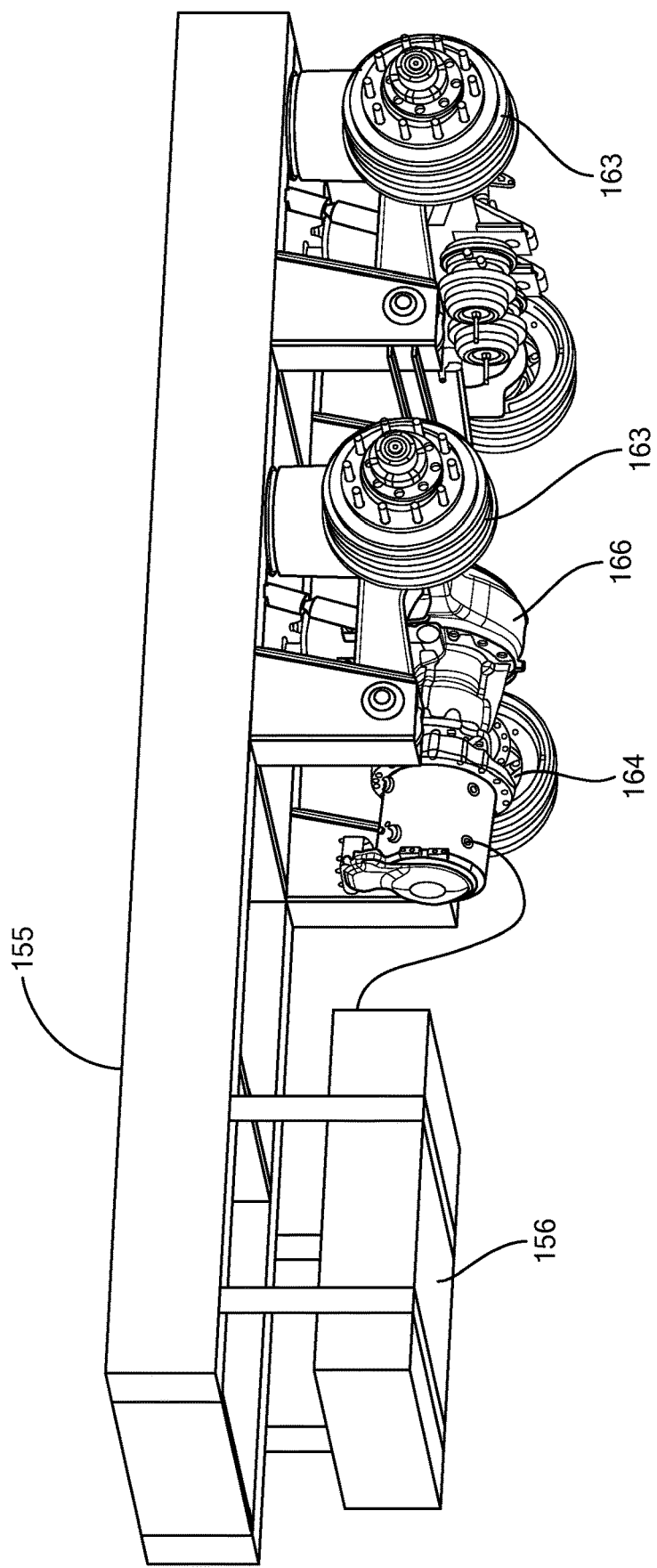
FIG. 2 shows a perspective view of an electronic axle (e-axle) on the trailer of FIG. 1.

An e-axle (electronic axle) 160 may also be invoked as at least one of the axles 162-1 . . . 162-2 (162 generally) of the trailer. FIG. 2 shows a perspective view of an undercarriage 155 and electronic axle (e-axle) on the trailer of FIG. 1. The e-axle 160 includes a generator 164 driven by a differential 166 in rotational communication with the axle 162 driven by the opposed wheels 163 (typically two wheels per side). The trailer vehicle 150 is adapted for engagement with a charge receptacle 170 for communication with a fixed power source for charging the battery 156 on the trailer. The charge receptacle 170 is part of the trailer bay or dock 172 and employs a tethered cable 174 engaged to a corresponding receptacle 176 or fixed cable attachment on the trailer 150. The charge receptacle allows reliable grid power to supplement on-vehicle hybrid sources and "top-off" the charge capacity of the battery 156 while the trailer is stationary.

Unlike electric automobiles, trailers are independent from the tractor vehicle and have limited, if any, interconnection. The conventional tractor cannot be automatically disabled based on the presence/connection of the tethered cable 174, which can set up a possible driveaway scenario depicted above. A method of identifying and preventing unintended driveaway of the parked trailer includes monitoring signals indicative of movement of one or more wheels 163 attached to the e-axle on the underside of the trailer for supporting motive transport. The e-axle effectively replaces a conventional passive axle and allows electrical generation from the mechanical energy of the rotating wheels. Since wheel movement induces electrical generation, control logic can determine, if the monitored signal indicates movement of the one or more wheels, and if so, determining if the battery is charging, meaning that the charge cable 174 is still connected.

Charge cables 174 generally employ a positive locking or latched engagement, in contrast to a frictional fit that most household AC outlets employ. Accordingly, a driveaway event can cause physical damage to the connected electrical hardware, and may leave exposed terminals or conductors that present a shock hazard. However, upon detecting wheel movement during charging, the controller can issue a reverse torque signal the e-axle based on the determination of an active charge cycle and corresponding engaged charge cable 174.

Reverse biasing is based on the concept that motors and generators perform complementary functions of converting electrical and mechanical energy. While a generator is a label for a device that is typically mechanically driven for producing an output current/voltage, application of a voltage will conversely induce movement from the current flow resulting from the higher external voltage. In other words, while applied mechanical rotation generates electrical energy, an applied voltage generates mechanical energy (rotation).

Wheel movement may also be detected by a wheel speed sensor or a hall effect sensor in response to wheel rotation, which also generates an electrical signal in response to wheel rotation. Other suitable transducer devices may convert mechanical movement/energy into a detectable electrical signal. Once determining that the wheels are moving, existence of a connected charge cable is determined. This may be accomplished by identifying an electrical terminal, such as the receptacle 176 or cable 174, adapted for an external power connection to a grid power source provided by charge receptacle 170, and determining if the electrical terminal has a voltage greater than a predetermined threshold indicative of a charging voltage. A typical charge voltage is high voltage AC, typically 240 V or 480 V, and may be 3-phase, much greater than a disconnected cable/receptacle having only background and/or static charge (maybe a few millivolts).

Figure 3:
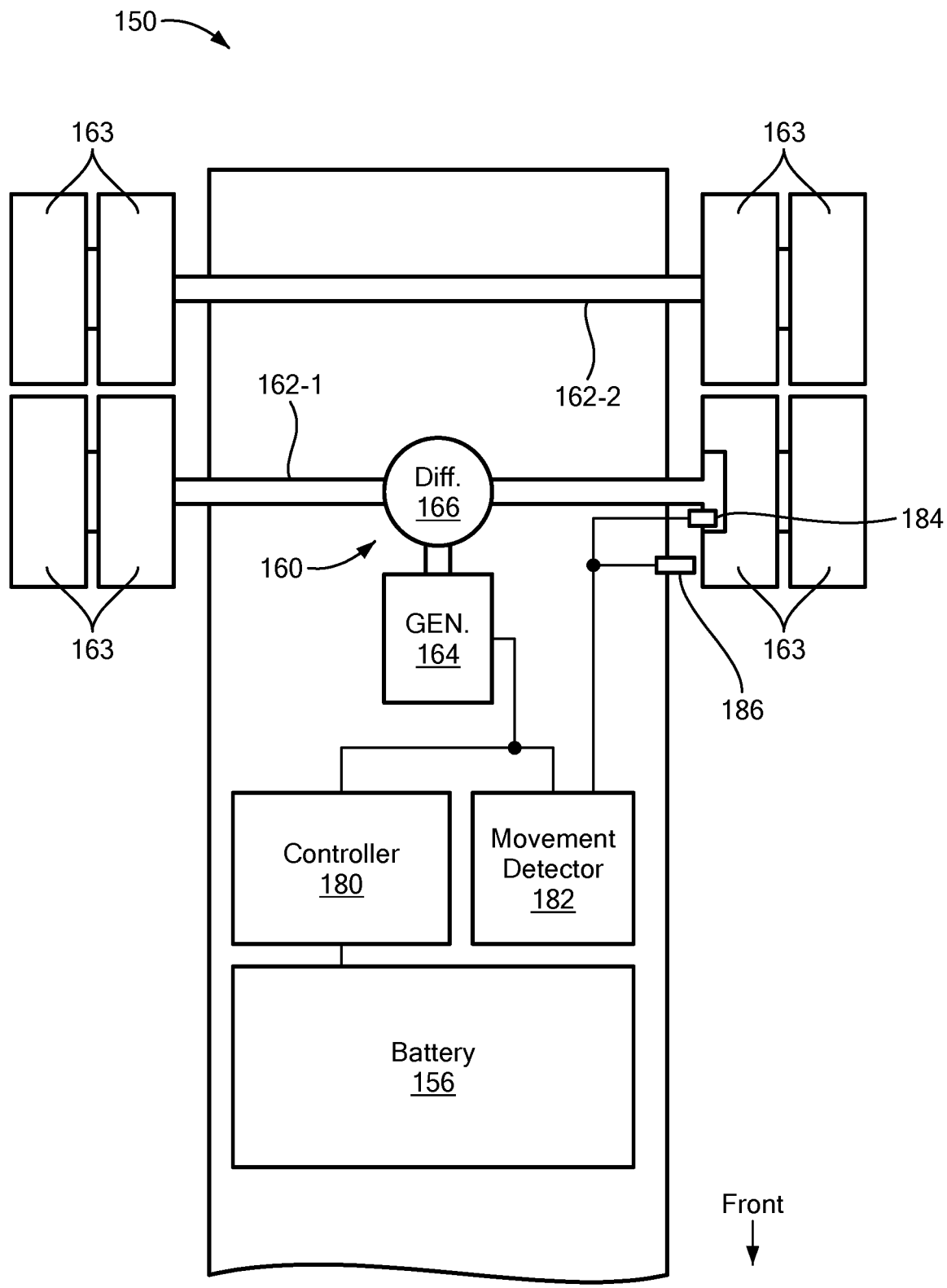
FIG. 3 shows a block diagram of trailer controls using the e-axle of FIG. 2.

FIG. 3 shows a block diagram of trailer controls using the e-axle of FIG. 2. Referring to FIGS. 1-3, a controller 180 determines wheel movement based on an electrical signal induced by wheel rotation from the e-axle generator 164. Alternatively, a movement detector 182 may detect wheel movement from a wheel speed sensor 184 or hall effect sensor 186. The controller 180 is typically adjacent the battery 156, suspended in a common structure or otherwise disposed on the underside of the trailer 150. The controller 180 may provide other trailer functions, such as charging and balancing, charge optimization and switching between charge sources and loads, in addition to providing a driveaway prevention circuit.

Figure 4:
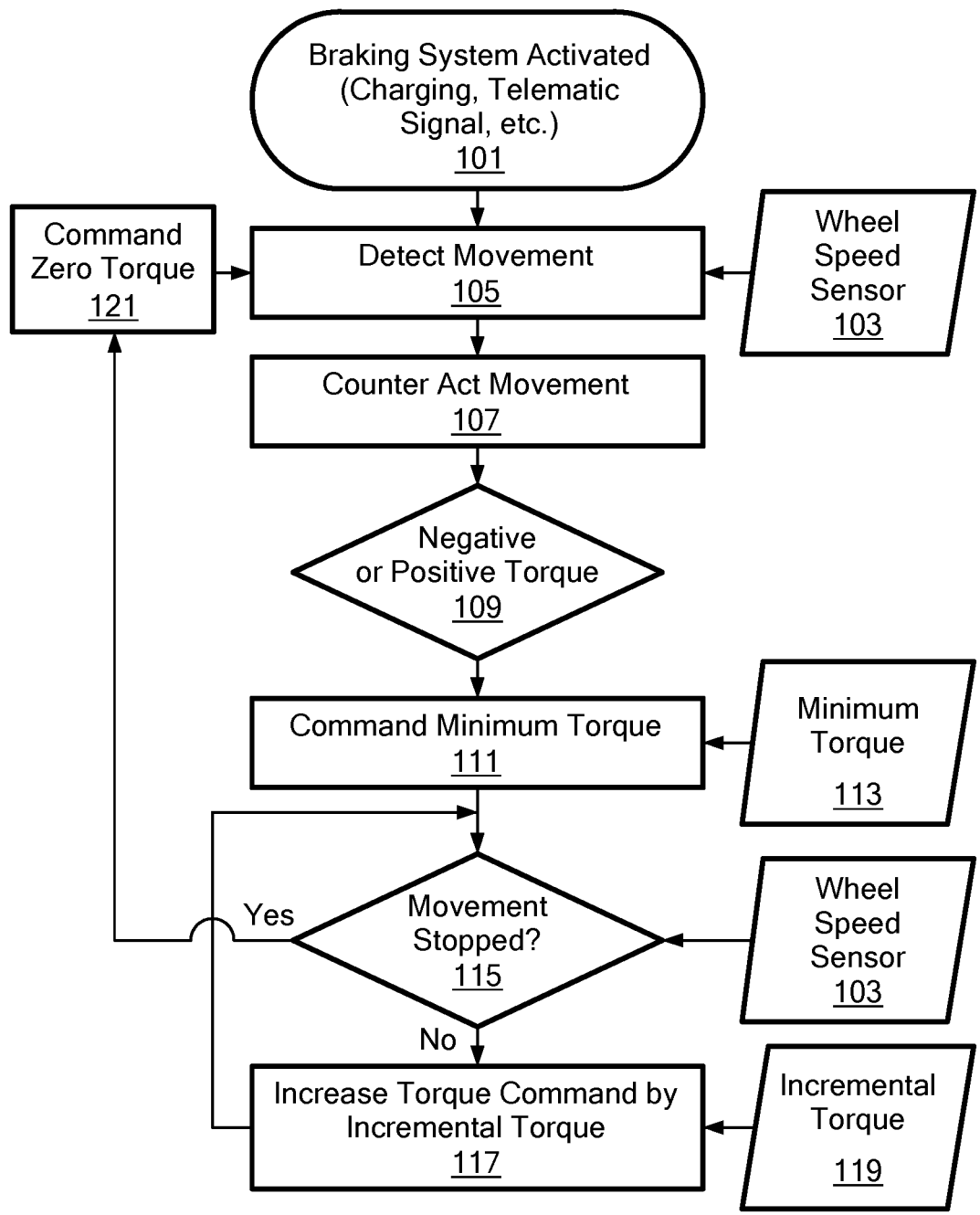
FIG. 4 is a flowchart of control logic for driveaway protection and prevention according to the controls of FIG. 3.

FIG. 4 is a flowchart of control logic for driveaway protection and prevention according to the controls of FIG. 3. In a trailer vehicle adapted for engagement with a charge receptacle for communication with a fixed power source, configurations herein provide a method of identifying and preventing unintended driveaway of a parked and charging trailer. Referring to FIG. 1, brakes are applied in an idle/charging trailer, as shown at step 101. This may be from detection of an attached plug or receptacle, discussed further below, an on-board telematics system for GPS locating, or other suitable mechanism. Often, conventional pneumatic brakes may be involved as well, however are subject to the same operator error as connection of a tractor, and the associated trailer pneumatic hoses would generally allow operator release of the pneumatic brakes.

The driveaway prevention circuit monitors signals from an e-axle indicative of movement of a pair of wheels attached to the e-axle, such as by a wheel speed sensor at step 103, which would result in an electromagnetic (i.e. small voltage signal) as the generator of the e-axle rotates. Alternatively, a Hall effect or similar sensor as is employed in ABS (Antilock Brake Systems) may be employed for detecting a rolling of the wheels.

Based on the signal, the driveaway prevention circuit determines if the monitored signal indicates movement of the pair of wheels, as shown at step 105. An interlock check is performed to determine if the battery is charging, to filter out an intended driveaway, and if not, the driveaway prevention circuit issues a reverse torque signal to the e-axle based on the determination of an active charge cycle, as depicted at step 107. Since the e-axle defines a wheel powered generator connected via a differential to the generator, a reverse voltage source induces a current flow TO the generator to drive momentum, rather than receive generated electrical energy.

A check is performed, at step 109, to determine which direction the wheels should be commanded to rotate. Generally this would be a reverse direction, meaning rotating the wheels to drive the trailer further backwards against the dock/bay, however negative or positive torque is altered merely by changing the polarity, or flow of current to the e-axle.

Initially, a small minimum torque is applied, based on a minimum torque needed to maintain a stationary trailer, as disclosed at step 111 from a received minimum torque value at 113. A check is performed, at step 115, to determine if movement has stopped based on additional input from the wheel speed sensor 103. If driveaway movement continues to be detected, the driveaway prevention circuit increases a magnitude of the reverse torque signal until the monitored signal indicates cessation of movement of the wheels, as shown at step 117. Incremental torque is applied in an iterative manner, as shown at step 119, until movement ceases, at which time a zero torque is commanded of the wheels 121.

Referring again to step 105, unintended or unintentional movement may be detected in several ways. Connection of a battery charge cable may be tested by an incoming high voltage presence (typically AC), or even by a higher DC charging voltage, as the charging voltage is typically about 15% higher than the nominal voltage of the battery. Using these approaches, the driveaway prevention circuit may determine if the charge is sourced from a tethered cable from an external source. Another option is to detect a running tractor motor based on a voltage from an electrical system of the tractor, as the alternator of a running engine will be higher (about 14.5 VDC) than an idle tractor (about 12.0 VDC). In the case of the latter, an interconnection between the tractor and trailer electrical systems is made to establish an electrical connection from the battery to the electrical system of the trailer. The driveaway prevention circuit may then determine a threshold voltage indicative of a rotating alternator driven by the tractor motor, and comparing a voltage at the battery to the threshold for determining if the tractor motor is running. Other suitable detection methods may be employed, such as an affirmative contact switch on the charging connection plug, but may require modification to otherwise standard shore power hookups.

In a charging scenario (i.e. cable still connected), a driveaway attempt is detected based on trailer wheel movement. This typically evaluates movement of the pair of wheels based on a voltage signal from a generator coupled to the pair of wheels, as the e-axle will begin producing a voltage signal once the wheels begin to roll. Still further, a hall effect or similar sensor as employed in ABS (Antilock Brake Systems) may be employed for detecting a rolling of the wheels.

A further usage of the powered e-axle for preventing movement is the use of theft prevention. An additional switch, wireless or telematics signal could be enabled to indicate that movement should be deterred. In such an instance, the driveaway prevention circuit could determine that an unauthorized attempt to move the trailer is occurring, and issue the reverse torque signal for maintaining the position of the trailer to prevent such unauthorized transport.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of identifying and preventing unintended driveaway of a trailer vehicle adapted for engagement with a charge receptacle for communication with a fixed power source for charging a battery on a trailer, the method comprising:
   monitoring signals indicative of movement of one or more wheels attached to an underside of the trailer for supporting motive transport;
   determining if the monitored signal indicates movement of the one or more wheels, and if so,
   determining if the battery is charging in an active charge cycle; and
   issuing a reverse torque signal to the one or more wheels based on the determination of the active charge cycle and the movement of the one or more wheels, wherein the reverse torque signal reverses movement of the one or more wheels to maintain a stationary position for the trailer vehicle while engaged with the fixed power source.

2. The method of claim 1 further comprising increasing a magnitude of the reverse torque signal until the monitored signal indicates cessation of movement of the wheels.

3. The method of claim 1 further comprising determining wheel movement based on an electrical signal induced by wheel rotation.

4. The method of claim 3 further comprising generating the electrical signal from an e-axle generator attached to the one or more wheels.

5. The method of claim 3 wherein the electrical signal is sent by a wheel speed sensor or a hall effect sensor in response to wheel rotation.

6. The method of claim 1 wherein determining if the battery is charging further comprises determining if the charge is sourced from a tethered cable from an external source.

7. The method of claim 6 further comprising:
   identifying an electrical terminal adapted for an external power connection to a grid power source; and
   determining if the electrical terminal has a voltage greater than a predetermined threshold indicative of a charging voltage.

8. The method of claim 6 further comprising:
   establishing an electrical connection from the battery to the electrical system of the trailer;
   determining a threshold voltage indicative of a rotating alternator driven by a tractor motor; and
   comparing a voltage at the battery to the threshold for determining if the tractor motor is running.

9. The method of claim 1 wherein determining if the battery is charging further comprises:
   detecting a running tractor motor based on a voltage from an electrical system of the tractor.

10. The method of claim 1 further comprising:
    evaluating movement of the pair of wheels based on a voltage signal from a generator coupled to the pair of wheels.

11. The method of claim 1 further comprising:
    determining an unauthorized attempt to move the trailer is occurring; and
    issuing the reverse torque signal for maintaining the stationary position of the trailer.

12. A driveaway prevention circuit, comprising:
    a connection to a generator for powering one or more wheels for monitoring signals indicative of movement of the one or more wheels attached to an underside of a trailer for supporting motive transport;

a battery;

control logic connected to the battery and configured to:
  determine, if the monitored signal indicates movement of the one or more wheels, and if so,
    determine if the battery is charging in an active charge cycle; and
    issue a reverse torque signal to the one or more wheels based on the determination of the active charge cycle.

13. The circuit of claim 12 wherein the control logic is configured to increase a magnitude of the reverse torque signal until the monitored signal indicates cessation of movement of the wheels.

14. The circuit of claim 12 wherein the monitored signal results from wheel movement based on an electrical signal induced by wheel rotation.

15. The circuit of claim 14 wherein the electrical signal emanates from a wheel speed sensor or a hall effect sensor in response to wheel rotation.

16. The circuit of claim 12 further comprising an electrical terminal coupled to a tethered cable from an external source for determining if the battery is charging.

17. The circuit of claim 16 further comprising a predetermined threshold for determining if the electrical terminal has a voltage greater than a predetermined threshold indicative of a charging voltage.

18. The circuit of claim 12, wherein the driveaway prevention circuit is configured for the trailer having the battery powered by an e-axle and a shore power connection to a grid power source, and further comprising issuing the reverse torque signal to the e-axle based on the determination of the active charge cycle.

19. A method of identifying and preventing unintended driveaway of a trailer including one or more wheels on an underside of the trailer for providing motive transport, and including a battery system adapted for charging from a fixed power source, the method comprising:

providing a control logic in communication with the battery system and the one or more wheels;

automatically determining signals indicative of movement of the one or more wheels;

automatically determining that the battery is charging from the fixed power source when determining the signals indicative of the movement of the one or more wheels; and issuing a reverse torque signal to reverse movement of the one or more wheels to maintain a stationary position for the trailer while the battery is charging from the fixed power source.

* * * * *